(12) United States Patent
Anderson et al.

(10) Patent No.: US 7,904,440 B2
(45) Date of Patent: Mar. 8, 2011

(54) SEARCH DIAGNOSTICS BASED UPON QUERY SETS

(75) Inventors: Blake E. Anderson, Bothell, WA (US);
Nancy E. Jacobs, Redmond, WA (US);
Reshma Girish Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 11/740,484

(22) Filed: Apr. 26, 2007

(65) Prior Publication Data
US 2008/0270356 A1 Oct. 30, 2008

(51) Int. Cl.
*G06F 17/30* (2006.01)
(52) U.S. Cl. .......................... 707/706; 707/723
(58) Field of Classification Search .................. None
See application file for complete search history.

(56) References Cited

U.S. PATENT DOCUMENTS

| | | | |
|---|---|---|---|
| 6,466,918 B1 * | 10/2002 | Spiegel et al. | 705/27 |
| 6,832,218 B1 * | 12/2004 | Emens et al. | 707/3 |
| 7,321,892 B2 * | 1/2008 | Vadon et al. | 707/4 |
| 7,386,543 B1 * | 6/2008 | Bharat et al. | 707/3 |
| 7,505,964 B2 * | 3/2009 | Tong et al. | 707/3 |
| 7,546,295 B2 * | 6/2009 | Brave et al. | 1/1 |
| 7,653,611 B2 | 1/2010 | Zheng et al. | |
| 7,685,192 B1 * | 3/2010 | Scofield et al. | 707/709 |
| 2004/0059732 A1 * | 3/2004 | Vaucher | 707/5 |
| 2005/0060311 A1 * | 3/2005 | Tong et al. | 707/7 |
| 2007/0016545 A1 * | 1/2007 | Broder et al. | 707/1 |
| 2007/0162424 A1 * | 7/2007 | Jeh et al. | 707/2 |
| 2008/0104047 A1 * | 5/2008 | Nagarajayya | 707/5 |

* cited by examiner

*Primary Examiner* — Neveen Abel-Jalil
*Assistant Examiner* — Kevin Young
(74) *Attorney, Agent, or Firm* — Merchant & Gould

(57) ABSTRACT

The subject disclosure pertains to systems and methods that facilitate monitoring of data collections and related data retrieval systems as well as generating recommendations for enhancing performance and utility of such systems. In aspects, the systems and methods described herein evaluate data retrieval performance by identifying unsuccessful search queries and mapping such queries to appropriate content in a data collection. To facilitate such evaluation, similar queries can be grouped and treated as equivalent. Similarity of queries can be determined based upon search terms. For example, queries whose search terms only vary syntactically can be combined in a group. Such groups can include search information related to multiple users, increasing reliability of recommendations based upon such groups. In further aspects, recommendations for adding content can be generated in conjunction with any mapping recommendations.

17 Claims, 14 Drawing Sheets

SEARCH DIAGNOSTICS BASED UPON QUERY SETS

BACKGROUND

There has been a huge growth in amount and availability of documents, tools and other data. The growth of the Internet and computer networking in general has seen an explosion in use of computers to provide create, manage and distribute data. Frequently, information is more readily available to individuals via computers and computer networks, rather than through traditional media (e.g., print, microfiche, microfilm, bound volumes and the like).

Due to the vast amount of information, it can be difficult to locate specific pieces of information. Traditional indexes may quickly become outdated as information added, deleted and/or updated. Furthermore, such indexes fail to utilize the capabilities and flexibility of computers. Computer search algorithms and techniques are capable of allowing users to search text rather than requiring users to guess keywords used to index content.

Computer search engines can locate desired information utilizing a variety of techniques or algorithms. The more efficient a search engine is at locating the desired information, the more valuable the search engine is to users. Even the most critical data is useless if it is inaccessible. Individual users become quickly frustrated when they are unable to obtain desired information and ineffective or unusable search tools can negate the advantages of computer-assisted research.

Utility and usability of help tools and other search engines can have monetary implications for content providers. Help tools may provide users with information necessary to fully utilize software or other products. The better the help tools, the better the user's experience and the more likely a user is to utilize the product, recommend the product to others and purchase additional products from a provider. Similarly, search engine providers typically make their profit by displaying advertisements. However, if the search engine cannot provide useful results, users will likely switch to a competitor's search engine forcing the provider to reduce advertising rates.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns diagnostics for search systems. Efficiency and identification of relevant information is critical in search systems. Consequently, monitoring performance, identifying potential improvements and generating recommendations to increase user satisfaction are also extremely important. Accordingly, diagnostic systems and methodologies to improve search systems are critical to the success of such systems.

The systems and methods described herein evaluate search history associated with a search system or search engine and identify potential improvements. In particular, a set of recommendations or modifications to the search system can be generated. In aspects, the systems and methods can identify unsuccessful queries and determine mapping recommendations that relate such queries to appropriate content. Similar queries can be grouped for analysis to identify mapping recommendations likely to increase user satisfaction with the search results. The grouped queries may be issued by disparate users.

In aspects, the systems and methods can also identify potential content for addition to the data collection. Queries are generally indicative of user desires. Consequently, queries that are not satisfied by content may be indicative of areas where additional data or content would be useful to users. This analysis can be performed in conjunction with the mapping of unsuccessful queries to content. A recommendation to obtain additional content may be generated only after a check is made as to whether such content already exists or whether a potential mapping recommendation has been generated.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
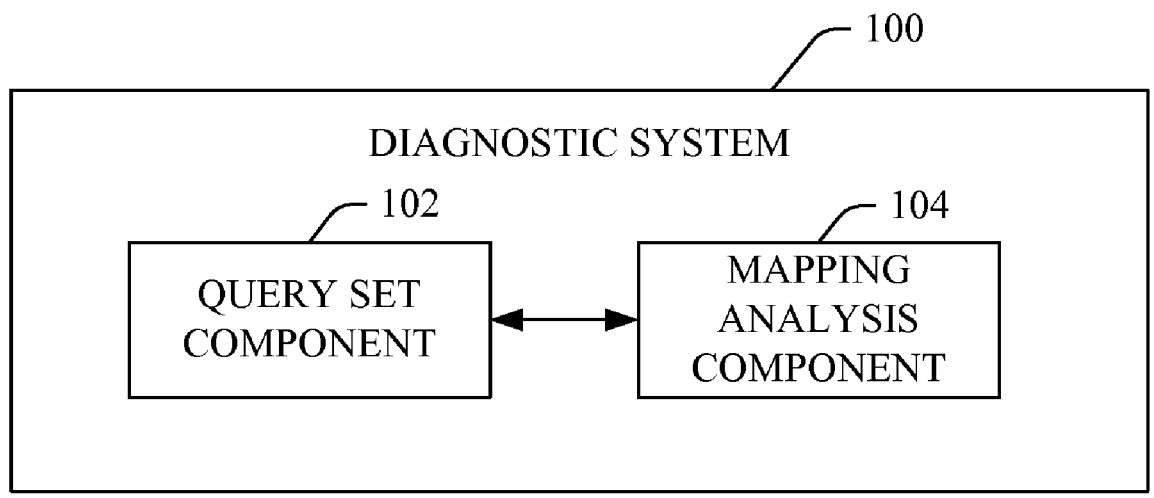
FIG. 1 is a block diagram of a diagnostic system that performs diagnostics for a search system in accordance with an aspect of the subject matter disclosed herein.

Turning now to the figures, FIG. 1 illustrates a diagnostic system 100 that performs diagnostics for a collection of data and/or a data retrieval or search system in accordance with an aspect of the subject matter disclosed herein. Diagnostic system 100 can include a query set component 102 that is capable of identifying similar queries from one or more users for analysis. The query set component 102 can group queries from disparate users based upon query terms, syntax, semantics or any other query-related information.

In particular, the query set component 102 can identify queries that vary in syntax, but are otherwise substantially similar or identical. For example, a first query "add time" and a second query "time adding" are based upon the same terms: "time" and "add." While word order and syntax vary, the terms are similar and likely to be intended to retrieve the same information. Accordingly, the query set component 102 can group the first query and second query within a query set during processing.

In further aspects, the query set component 102 can perform a semantic analysis of queries to group similar queries. The query set component 102 can analyze query terms, identify synonyms or comparable terms, and group queries that are likely to be related. In aspects, the query set component 102 can infer similarity based upon search history. The query set component 102 can utilize any other method to determine substantially similar or equivalent queries.

Queries within a query set can be treated as equivalent. Query sets can be composed of queries issued by multiple users. Recommendations derived from analysis of data from diverse users may more resilient and/or less susceptible to influence by an idiosyncratic individual. Therefore, use of search data associated with a plurality of users may improve reliability of a diagnostic system.

Diagnostic system 100 can also include a mapping analysis component 104 that can analyze query sets and related data to map queries to appropriate content. The mapping analysis component 104 can identify a query set related to an asset or particular piece of content, where queries from that query set would not ordinarily locate that asset and the query set is not currently mapped to that asset. As used herein, the term "map" indicates a relationship between a query set and an asset, where the query set would not otherwise be associated with the asset. Mapping a query set to an asset allows queries from that the query set to locate that asset. Since queries within a query set are considered equivalent, mapping a query set to an asset effectively maps all of the queries within the query set to the asset.

In aspects, mapping can be performed by adding terms to a search index. A search index can be created from a statistical analysis of the contents of a document. That search index will locate a document in response to a query if the terms of the query are associated with the document within the search index. However, there may be related query terms that are not contained within the document, and therefore not included within the search index. The process of "mapping" queries essentially associates the queries with the document and adds the terms to the search index.

The mapping analysis component 104 can analyze session information related to query sets to generate recommendations for mapping a query set to an asset. As used herein, a session refers to one or more queries issued by a user and the results of the queries. In aspects, sessions can also include assets located indirectly through links embedded within assets as well as assets located directly through search results.

An exemplary session is depicted below:

Session
  Query 1
    Asset 1→Reject
    Asset 2→Reject
  Query 2
    Asset 3→Reject
  Query 3
    Asset 4→Accept Here, a user issues a first query that returns two assets (e.g., Asset 1 and Asset 2). The assets are not satisfactory and are rejected by the user. The user issues a second query that retrieves a third asset (e.g., Asset 3) that is also rejected. Finally, the user issues a third query that returns an asset (e.g., Asset 4) that is accepted by the user. Acceptance and rejection can be determined based upon explicit feedback from the user or can be inferred based upon user actions. If similar patterns of acceptance and rejection occur frequently for such queries or their equivalents, Query 1 and Query 2 can be mapped to Asset 4. Such a mapping would assist future users in locating Asset 4. A query can be identified as a candidate for mapping to a particular asset when the query appears in a session that leads user satisfaction with the asset, but the query itself does not result in retrieval of the asset.

The mapping analysis component 104 can evaluate session information for query sets to determine if there is sufficient evidence to map a query set to a particular asset. If multiple queries within a query set are included in sessions that ultimately lead to user satisfaction with the same asset, there is strong evidence to support the mapping of the query set to the asset. A configurable threshold can be set to determine the number of sessions sufficient to support a mapping.

Figure 2:
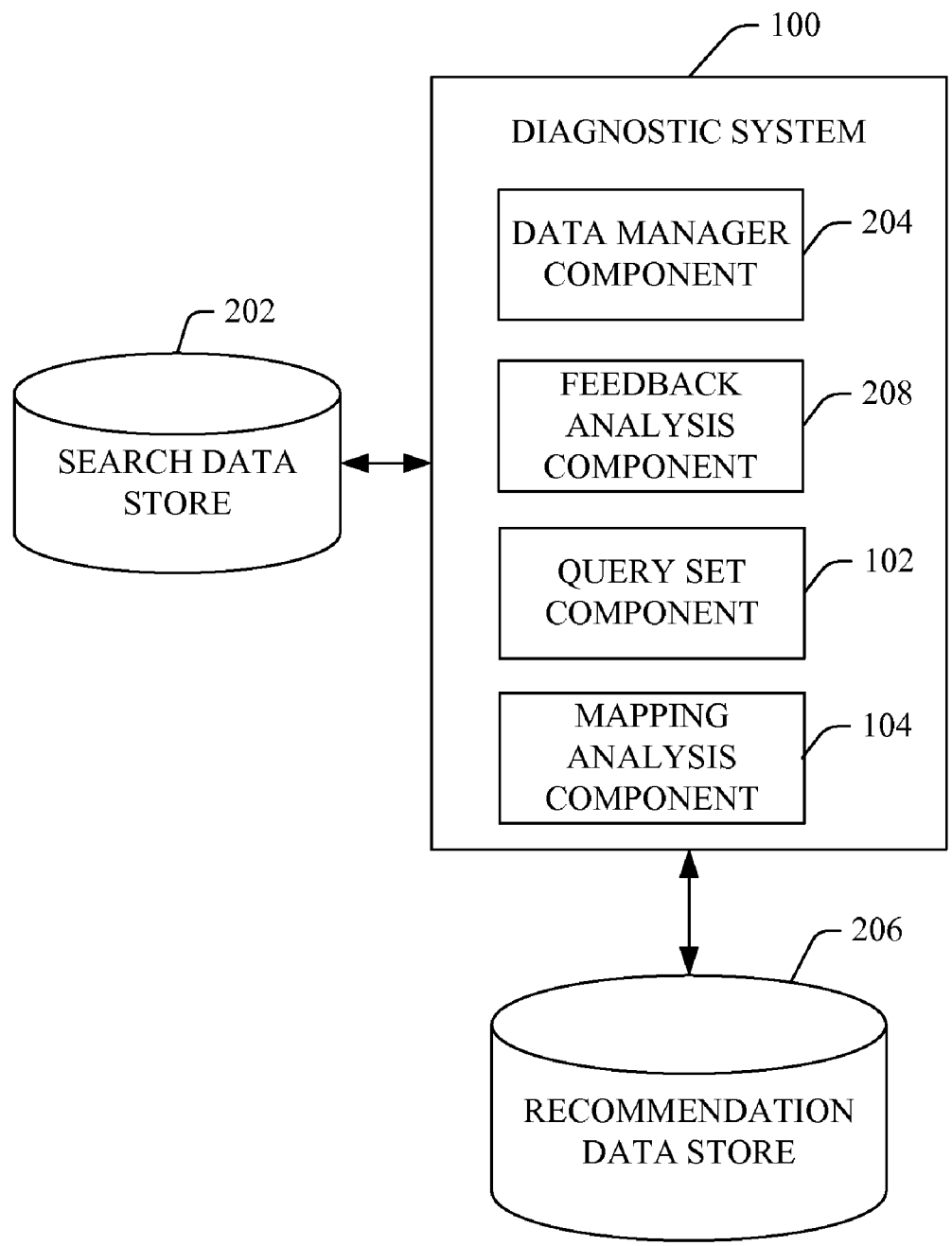
FIG. 2 is a block diagram of a further aspect of a diagnostic system that performs diagnostics for a search system in accordance with an aspect of the subject matter disclosed herein.

Turning now to FIG. 2, a further aspect of the system of FIG. 1 is illustrated. The diagnostic system 100 can utilize search history related to a website, data library or any other collection of data and associated data retrieval system. The search data can include data related to user search sessions for the search system. For example, the search data can also include user feedback, data related to the user, user actions with respect to the provided search results, or any other information related to use of the search system.

Search data can be obtained from a search data store 202. As used herein, a search data store is any collection of data including, but not limited to, a database, a collection of files, and a cache. The search data store 202 can be remotely located or incorporated in the diagnostic system. Moreover, the search data store 202 can be updated as users issue additional searches.

The diagnostic system 100 can include a data manager component 204 that is capable of obtaining or receiving search data from the search data store 202. Data manager component 204 can retrieve data from the search data store 202 based upon user sessions, query search terms, user information and/or any other suitable basis. Alternatively, data manager component 204 can receive and filter search data provided by the search data store 202. Furthermore, data manager component 204 can retrieve updated information from the search data store 202.

In addition, the data manager component 204 can manage recommendation information, such as mapping recommendations, threshold levels for determining mapping of query sets to assets, query set information, support for various mappings or any other relevant information. Data manager component 204 can update recommendation information as additional search data is processed. Recommendation information can be maintained in the search data store 202, or in a separate data store, such as the recommendation data store 206. The recommendation data store 206 can be remotely located or incorporated into the diagnostic system.

The diagnostic system 100 can also include a feedback analysis component 208 that determines user satisfaction based upon the search data. User satisfaction with an asset can be determined in a variety of ways. Users can explicitly indicate their satisfaction using rankings, rating, comments or other direct feedback. In addition, user satisfaction can be inferred from user behavior. For instance, similarity of behavior to users that have explicitly indicated satisfaction or dissatisfaction, time spent viewing an asset, user actions (e.g., print, save or bookmark of an asset) and the like. The feedback analysis component 208 can utilize any suitable methodology for determine user satisfaction with an asset.

Figure 3:
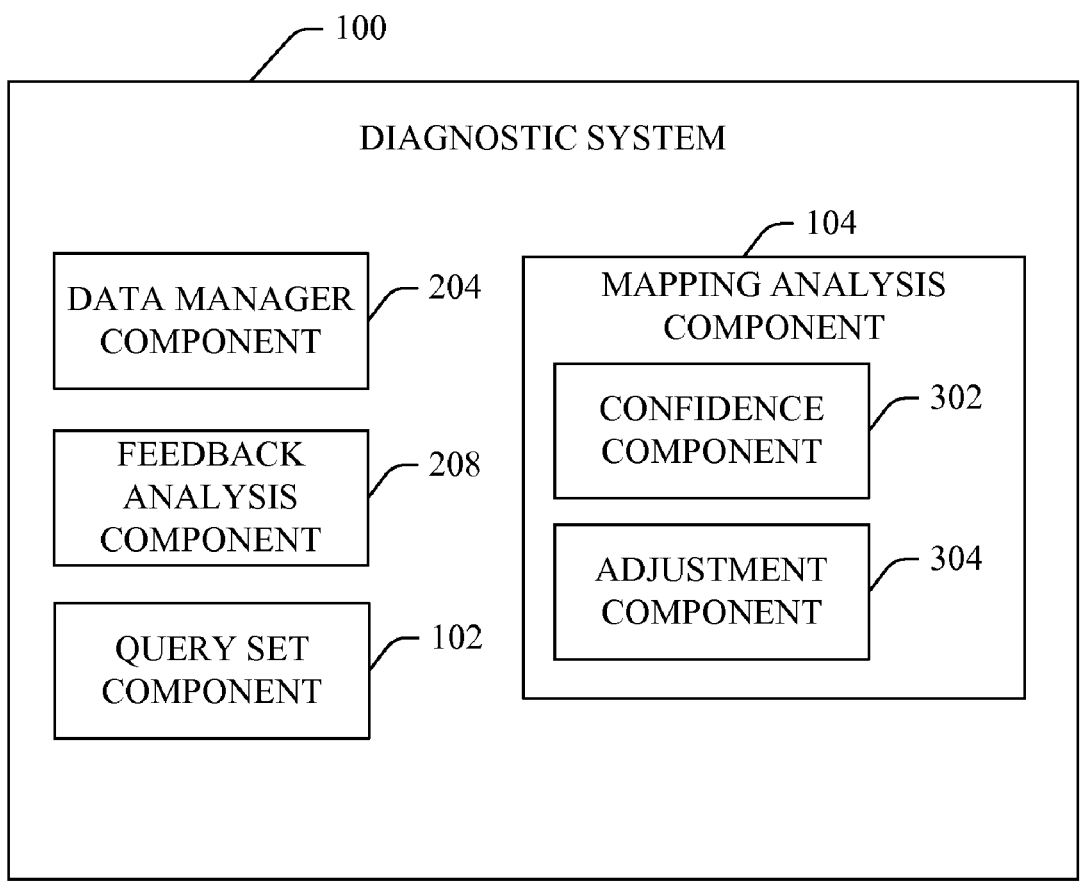
FIG. 3 is a block diagram of another aspect of a diagnostic system that performs diagnostics for a search system in accordance with an aspect of the subject matter disclosed herein.

Turning now to FIG. 3, the mapping analysis component 104 can determine a confidence value, score or rating of a mapping recommendation that reflect the probable utility of the mapping. For instance, the greater the evidence that supports the mapping recommendation, the higher the score. The score can be used to determine which, if any, of recommended mappings to implement in the data retrieval system.

The mapping analysis component 104 can include a confidence component 302 that generates a score or ranking based upon the amount of support for the mapping within the search data. The score can vary as additional information is added. The score can be compared to one or more thresholds to determine the appropriate action for the mapping recommendation. For example, recommended mappings can be ranked or prioritized based upon such scores.

An adjustment component 304 can modify the scores for a potential mapping recommendations based upon certain scenarios that affect utility of the mapping. For instance, if the query is mapped to or recommended for a large number of assets, the query may be too broad to be useful to users. Such queries may be too broad to be deterministic. For example, a user can issue a first query for "Excel" and then a second query "how to do conditional formulas in Excel." Another user can issue the same first query for "Excel," but the second query may be very different, "how to print a spreadsheet." The term "Excel" may appear in numerous search sessions, resulting in recommendations for mapping to a wide variety of assets. Accordingly, such queries can be penalized and their scores reduced to avoid recommending too-generic mappings. The number of assets associated with a query can be compared to a configurable threshold to determine whether to penalize the query and/or the extent of the penalty to be applied.

The confidence level for a mapping recommendation can also be reduced if the asset is excessively broad. If an asset is recommended for mapping to an excessive number of queries, it can indicate that the asset is too generic for any query to be mapped specifically to the asset. For example, assets that list available templates, Frequently Asked Question (FAQ) files, indexes and the like may map to a large number of queries, may be no more likely to satisfy the user than any of the other search results returned for the queries. The adjustment component 304 can modify the scores of such mappings to reflect the probable user satisfaction for the mapping. The number of queries associated with an asset can be compared to a configurable threshold to determine whether to penalize the asset and/or the extent of the penalty to be applied.

The adjustment component 304 can also evaluate the search history for combinations of a query and asset associated with a query set-asset mapping recommendation. If users that issued the query and viewed the asset have been generally dissatisfied, it may indicate that users that issue that query are unlikely to be satisfied with the asset. Accordingly, the adjustment component 304 can apply a penalty to the mapping recommendation. The number of dissatisfied users and the extent of their dissatisfaction can be compared to configurable thresholds to determine whether a penalty is to be applied and/or the extent of the penalty.

The adjustment component 304 can also apply a penalty if the search data indicates that users that issue the query and view the asset are very satisfied. If the combination occurs frequently and users are satisfied, then the implication is that the data retrieval system is working effectively and a recommended mapping is unnecessary. A configurable threshold or thresholds can be used to determine if the recommendation is unnecessary.

Figure 4:
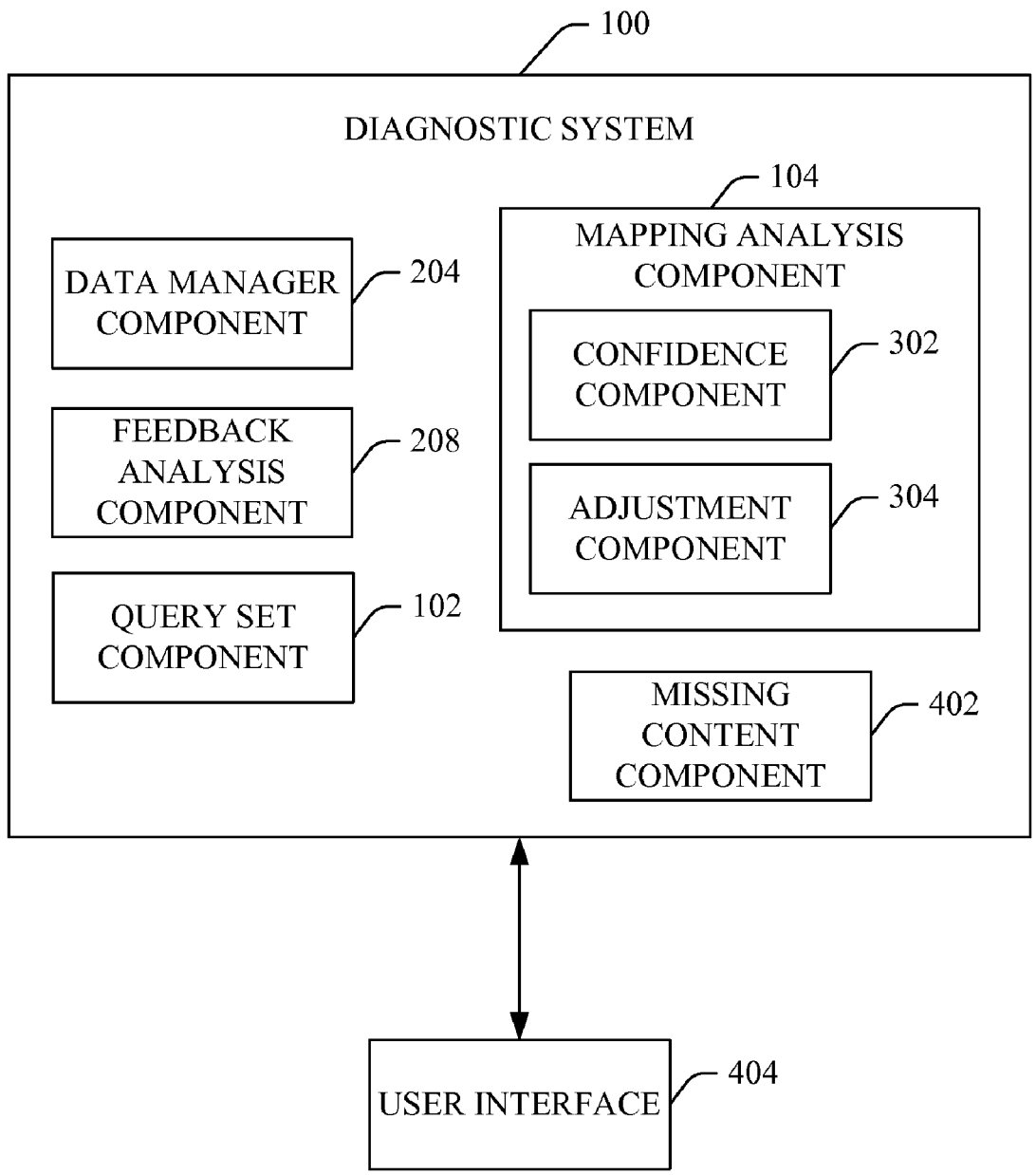
FIG. 4 is a block diagram of a further aspect of a diagnostic system that identifies missing content in accordance with an aspect of the subject matter disclosed herein.

FIG. 4 illustrates an exemplary diagnostic system 100 that is capable of identifying areas or subjects where it may be desirable to incorporate additional content. The diagnostic system 100 can include a missing content component 402 that can utilize search data to identify areas where additional data, information or other content may be useful. The missing content component 402 can generate recommendations that specify areas where additional information is desired, allowing content authors or compiler to generate or obtain information.

In addition to monitoring retrieval of data, the diagnostic system 100 can assist in evaluating content contained within the website, data library or other data source. To attract and assist users, content providers typically wish to provide the best content possible. However, predicting the desires of users can be complicated. Surveys, questions and other sources can be incomplete or may become quickly dated. Better information regarding users' needs may be obtained by analysis of users queries. The missing content component 402 can analyze user queries to determine when users were unable to obtain satisfactory content. This information can be provided to content providers, assisting providers in creating, obtaining or adapting content to meet user needs.

The missing content component 402 can evaluate query sets to determine whether the sets indicate lack of relevant content. As described above, query sets include similar queries. If a query set has a high percentage of dissatisfaction across all users that have issued a query within that query set, then there is an indication that content necessary to satisfy that query does not exist, is not included in the data collection, or is not easily discoverable in the results set. It is possible that content exists and the query and asset are simply not mapped. Missing content can be cross-referenced with mapping recommendations generated by the mapping analysis component 104.

The missing content component 402 can obtain information regarding mapping recommendations associating a query set and an asset and refrain from generating a missing content recommendation if a related mapping recommendation exists. The missing content component 402 can refrain from recommending adding content to provide an opportunity for the mapping to resolve user dissatisfaction. If the recommended mapping is successful, user dissatisfaction should decrease without adding content. If there is no related query asset recommendation, the missing content component 402 can provide a recommendation for addition of content to the data collection.

The diagnostic system 100 can also include, or communicate with, a user interface 404. The user interface 404 can provide content providers and/or managers with the ability to monitor performance, view recommended mappings, adjust system thresholds, update search data and manage the diagnostic system. In particular, a graphic user interface (GUI) can be used to manage the diagnostic system 100. The user interface 404 can provide recommendations and other data via text messages, automated voice messages, email, instant messaging, various reports or any other suitable method for communicating recommendation and system information.

The diagnostic system 100 can also automatically update or modify the search or data retrieval system to implement recommended query set-asset mappings. Furthermore, query set-asset mappings can be selected for automatic implementation based upon confidence levels or scores generated by the confidence component 302 as modified by the adjustment component 304. The mappings can be categorized based upon confidence levels. For example, mapping recommendations with high confidence levels can be implemented automatically, mapping recommendations with mid-range confidence levels can be included in recommendations to content providers and mapping recommendations with relatively low confidence levels can be identified for further evaluation.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 5:
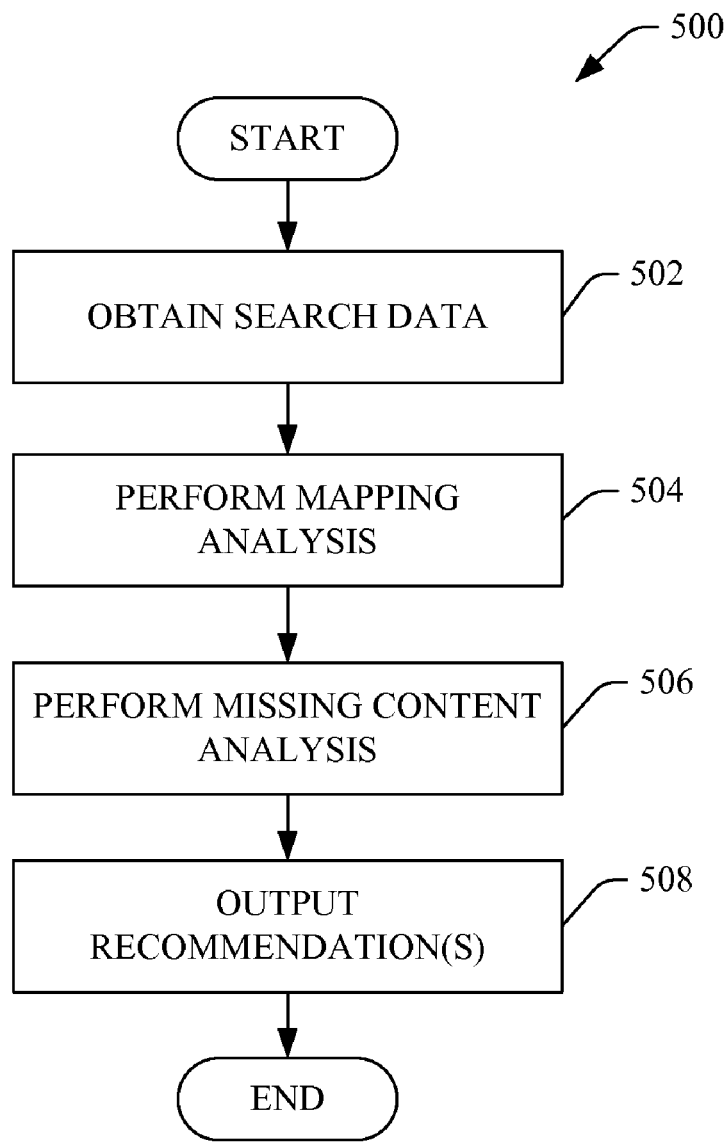
FIG. 5 illustrates an exemplary methodology for performing diagnostics for a data collection and/or data retrieval system in accordance with an aspect of the subject matter disclosed herein.

Turning now to FIG. 5, an exemplary methodology 500 for performing diagnostics for a data collection and/or data retrieval system is illustrated. At 502, search data can be obtained for a data collection. Search data can include user queries, search results associated with such queries, user feedback for assets retrieved during a search, user information or any other information related to a user search. Search data can be retrieved from a data store (e.g., a database, one or more data files, and the like). Alternatively, search data can be provided by the data collection and retrieval system to be evaluated.

At 504, mapping analysis can be performed. During mapping analysis, queries can be grouped into sets that contain similar queries. Query sets that currently do not result in user satisfaction can be identified. Search data can be evaluated to generate one or more recommendations for matching such query sets to assets.

Missing content analysis can be performed at 506. During missing content analysis, queries that do not provide satisfactory assets are identified. Such queries can be indicative of content missing from the data collection. However, queries that do not provide satisfactory assets can also be resolved by mapping to existing assets. If a mapping recommendation has already been generated for the identified query set, the missing content recommendation can be cancelled. There is a presumption that it is more likely that the query was simply not able to locate the desired information than that the information is not included in the data collection. Consequently, a missing content recommendation is generated only if there is no corresponding mapping recommendation.

At 508, the generated mapping and missing content recommendations can be output. The recommendations can be provided in an email, voice mail, text message, instant messaging, a user interface or any other method for communication with content providers and/or managers. Alternatively, the recommendations can be automatically implemented.

Figure 6:
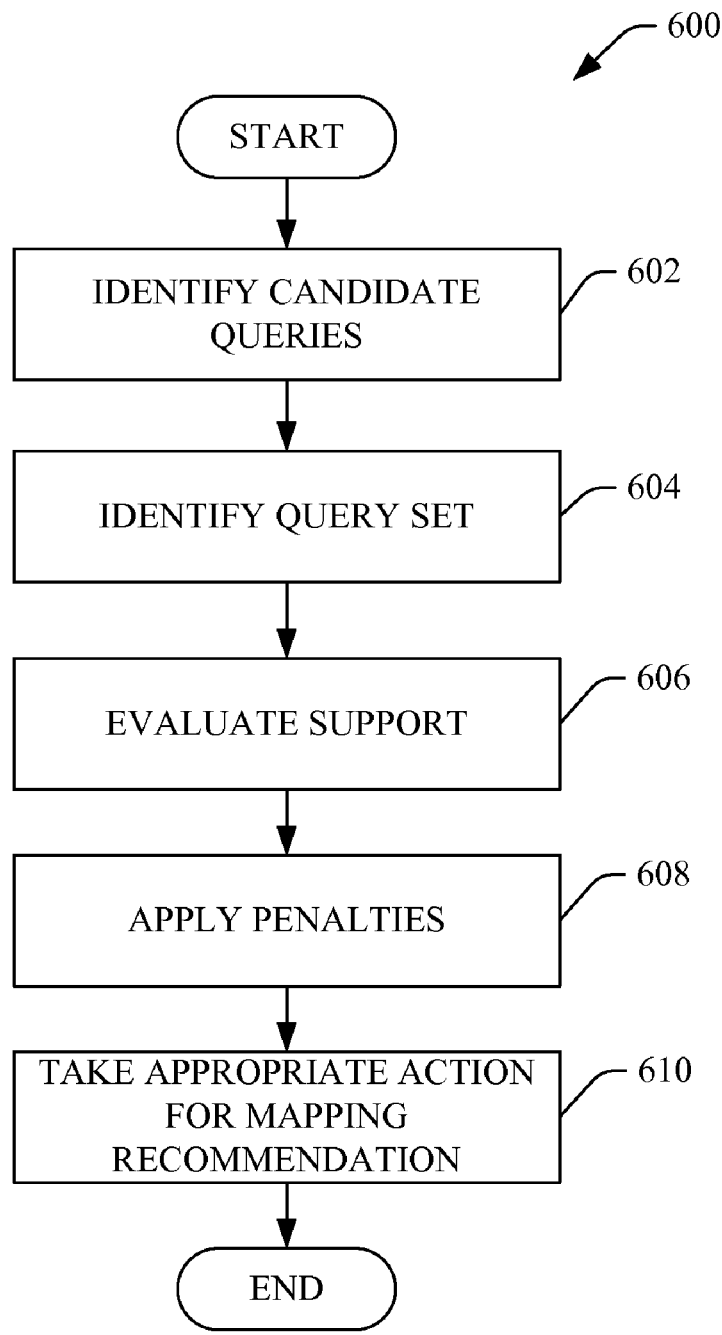
FIG. 6 illustrates an exemplary methodology for generating mapping recommendations that relate queries and assets in accordance with an aspect of the subject matter disclosed herein.

Referring now to FIG. 6, an exemplary methodology 600 for generating query set-asset mapping recommendations is illustrated. At 602, one or more candidate queries can be identified based upon evaluation of a search session. In particular, it can be determined if the session resulted in a satisfactory asset. If there was at least one satisfactory asset, any queries within the session that did not retrieve any satisfactory assets can be identified as "candidates" for mapping to the satisfactory asset.

At 604, a query set for a particular candidate query is identified. The query set can consist of queries that are substantially similar to the candidate query. For instance, queries within a query set may contain the same search terms, with syntactic or word order variations. In other aspects, query sets can include queries that contain synonymous search terms.

The evidence or support for a mapping recommendation of the query set to the asset can be evaluated at 606. In general, queries contained within a query set can be considered equivalent. Consequently, the entire set of queries in the query set can be evaluated. Other instances where equivalent queries appear in sessions that result in user satisfaction with the same asset provide evidence that the candidate query can be mapped to the asset. A confidence value, score or rating can be produced based upon the number of such instances.

At 608, any penalties can be applied to the score of the mapping recommendation. For example, a penalty can be applied if the query is overly broad and returns search results including excessive numbers of assets. Similarly, if the asset in question is overly broad, it is unlikely to have significant utility for the particular query set and a penalty can be applied to the score of the query set-asset mapping. Furthermore, penalties can be applied based upon previous combinations of the query set and asset. For example, if there is a high degree of dissatisfaction among users issuing the queries within the query set and viewing the asset, the query set-asset mapping is unlikely to improve utility and may be penalized. Conversely, if there is a high degree of satisfaction among users issuing a query within the query set and viewing the asset, the evidence suggests that the data retrieval system is working well and the mapping recommendation may be unnecessary.

After any penalties are applied, the appropriate action can be taken based upon the mapping recommendation at 610. Appropriate action can vary based upon comparison of a mapping recommendation score to a threshold or set of thresholds. For example, after application of any penalties, appropriate action may include performing further analysis without modifying the search system. Appropriate action can also include adding the mapping to a report detailing suggested modifications of a data retrieval system. Alternatively, appropriate actions can also include automatically updating the data retrieval system to improve performance. The report can also include a confidence score that reflects that probability that the mapping recommendation will improve user satisfaction with the data retrieval system. Reports can be provided using any suitable method (e.g., a graphic user interface, email, text and/or instant messaging, voice mail and the like).

Figure 7:
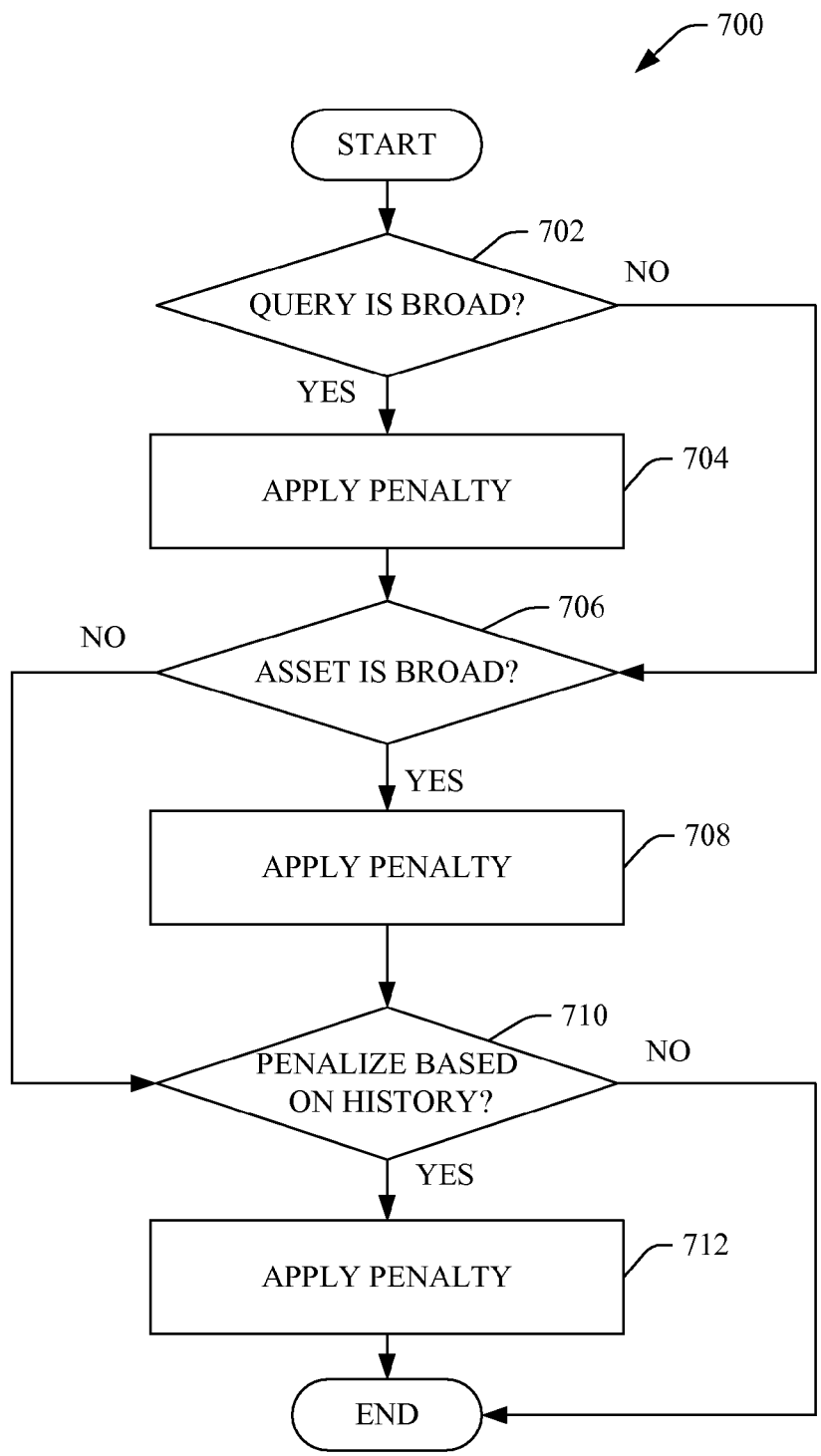
FIG. 7 illustrates an exemplary methodology for determining penalties applied to mapping recommendation confidence values in accordance with an aspect of the subject matter disclosed herein.

Referring now to FIG. 7, an exemplary methodology 700 for determining penalties to be applied to mapping recommendation scores is illustrated. At 702, a determination is made as to whether a query is excessively broad. A query can be considered broad if the query maps to a large number of assets. The number of assets can be compared to a configurable threshold or set of thresholds to determine if the penalty should be applied and/or the amount of penalty to be applied. If the query is determined to be excessively broad, a penalty is applied at 704. If the query is not considered broad, the process continues at 706.

At 706, a determination is made as to whether the asset is excessively broad. An asset can be considered broad if the asset maps to a large number of queries. The number of queries can be compared to a configurable threshold or set of thresholds to determine if the penalty should be applied and/or the amount of penalty to be applied. If the asset is determined to be excessively broad, a penalty is applied at 708. If the asset is not considered broad, the process continues at 710.

At 710, a determination is made as to whether a penalty should be applied based upon search data information regarding combinations of the query and asset. In particular, if users that issue the query or an equivalent query and view the asset are typically dissatisfied with the asset, the query set-asset mapping is unlikely to enhance search performance and the mapping recommendation can be penalized. Conversely, if users that issue the query or an equivalent query and view the asset are highly satisfied, it may indicate that users or obtaining the desired results and the mapping recommendation is unlikely to enhance search performance. Therefore, the mapping can be penalized to avoid implementation of the recommendation. If the mapping recommendation is to be penalized, the penalty can be applied at 712.

Figure 8:
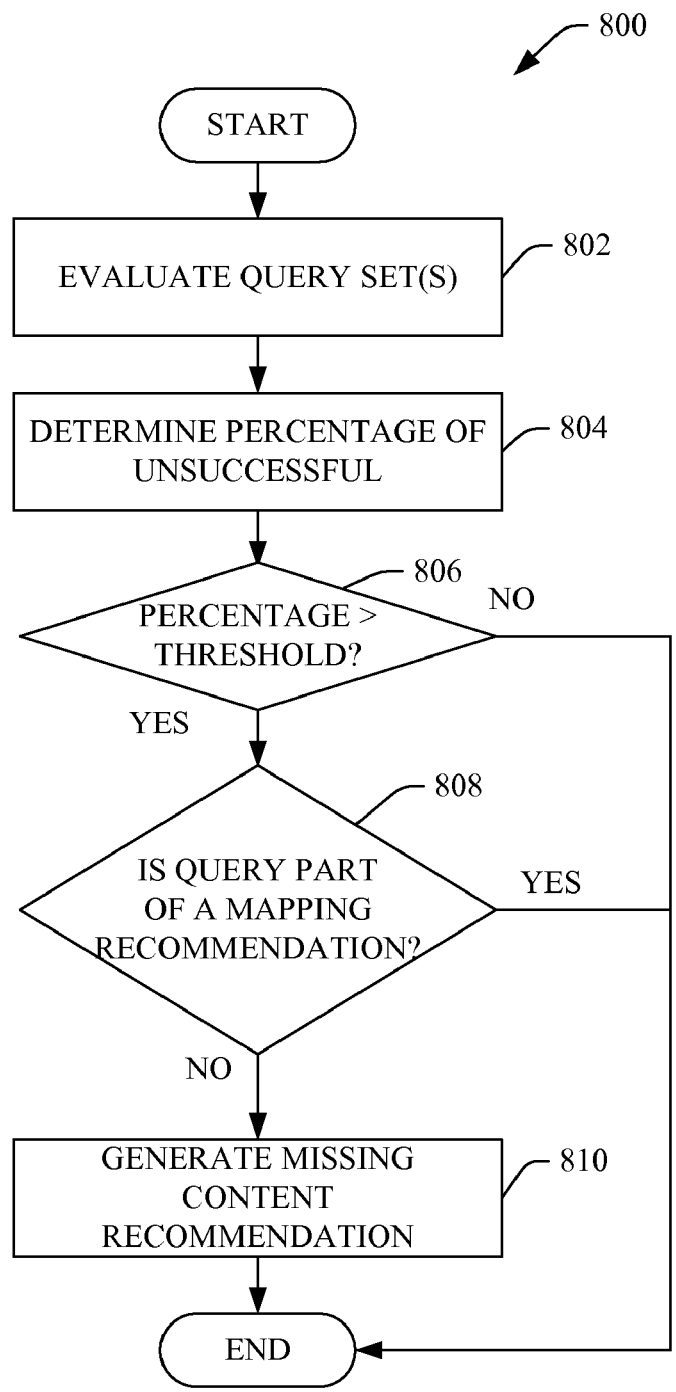
FIG. 8 illustrates an exemplary methodology for generating missing content recommendations in accordance with an aspect of the subject matter disclosed herein.

Referring now to FIG. 8, an exemplary methodology 800 for generating missing content recommendations is illustrated. At 802, a query set can be evaluated. As described above, similar queries can be grouped into query sets for analysis. At 804, the percentage of dissatisfaction with results of the query set can be determined. As used herein, the percentage of dissatisfaction is equal to the percentage of queries within the query set that retrieved assets that did not satisfy the user. The greater the user dissatisfaction with search results related to the query set, the greater the likelihood that the content does not include assets that would satisfy the user.

At 806, a determination is made as to whether the percentage of dissatisfaction is greater than a configurable threshold (e.g., 90%). If dissatisfaction is less than or equal to the threshold, a missing content recommendation for the query set will not be made and the process can terminate. However, if user dissatisfaction rate is greater than the threshold, the process can continue at 808.

At 808, a determination is made as to whether the query set is part of a mapping recommendation. If it is likely that a satisfactory asset exists, and user needs can be satisfied by improving retrieval of content, then a recommendation to add content is not generated. Accordingly, if the query set is part of a mapping recommendation, the process terminates without generating a missing content recommendation, allowing the problem to resolve based upon mapping enhancements. If the query set is not part of a mapping recommendation, then a missing content recommendation can be generated at 810. The recommendation can be used by content authors and providers to create and/or obtain desired assets.

Figure 9:
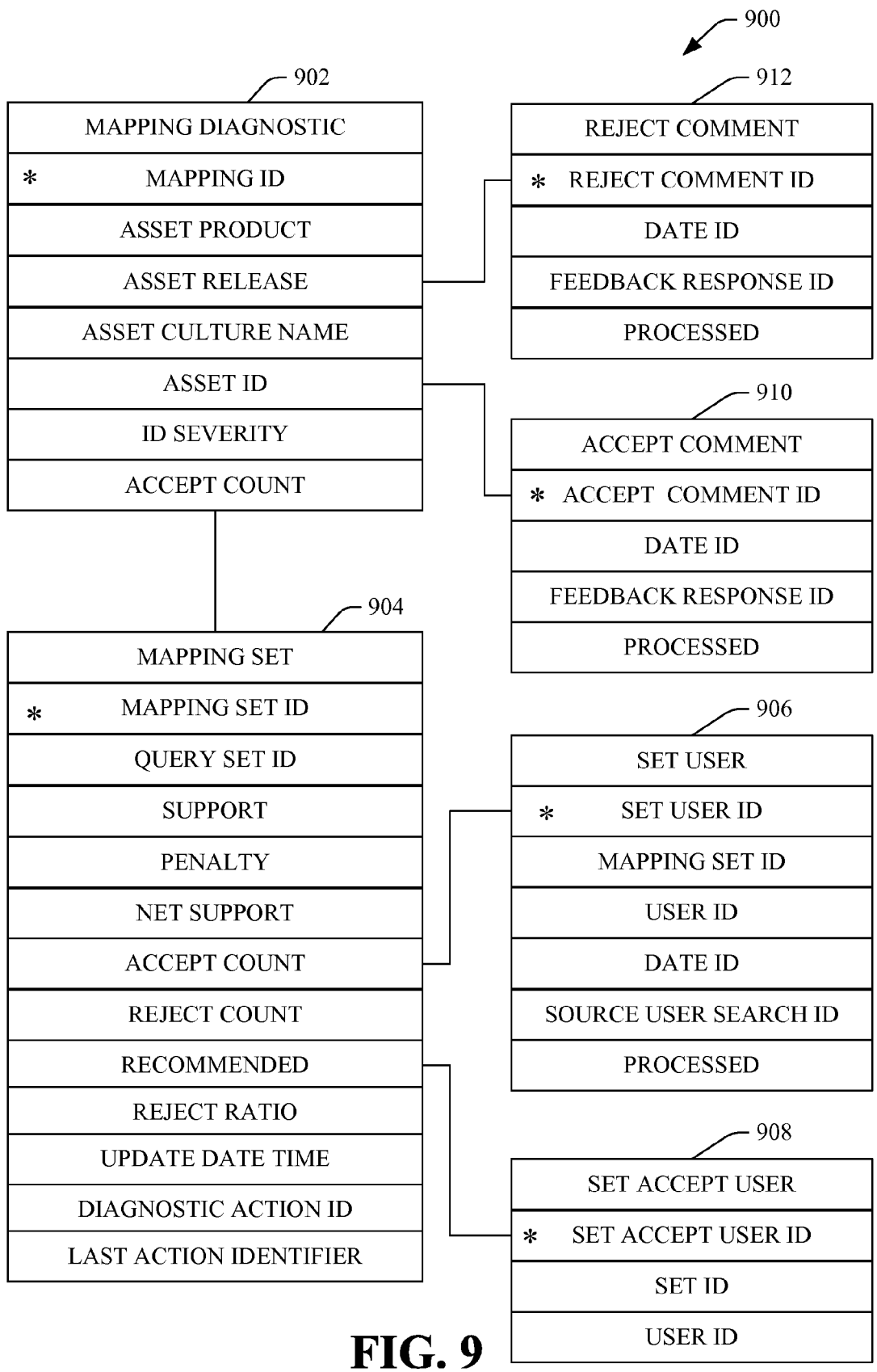
FIG. 9 illustrates an exemplary database schematic for mapping recommendation information in accordance with an aspect of the subject matter disclosed herein.
Figure 10:
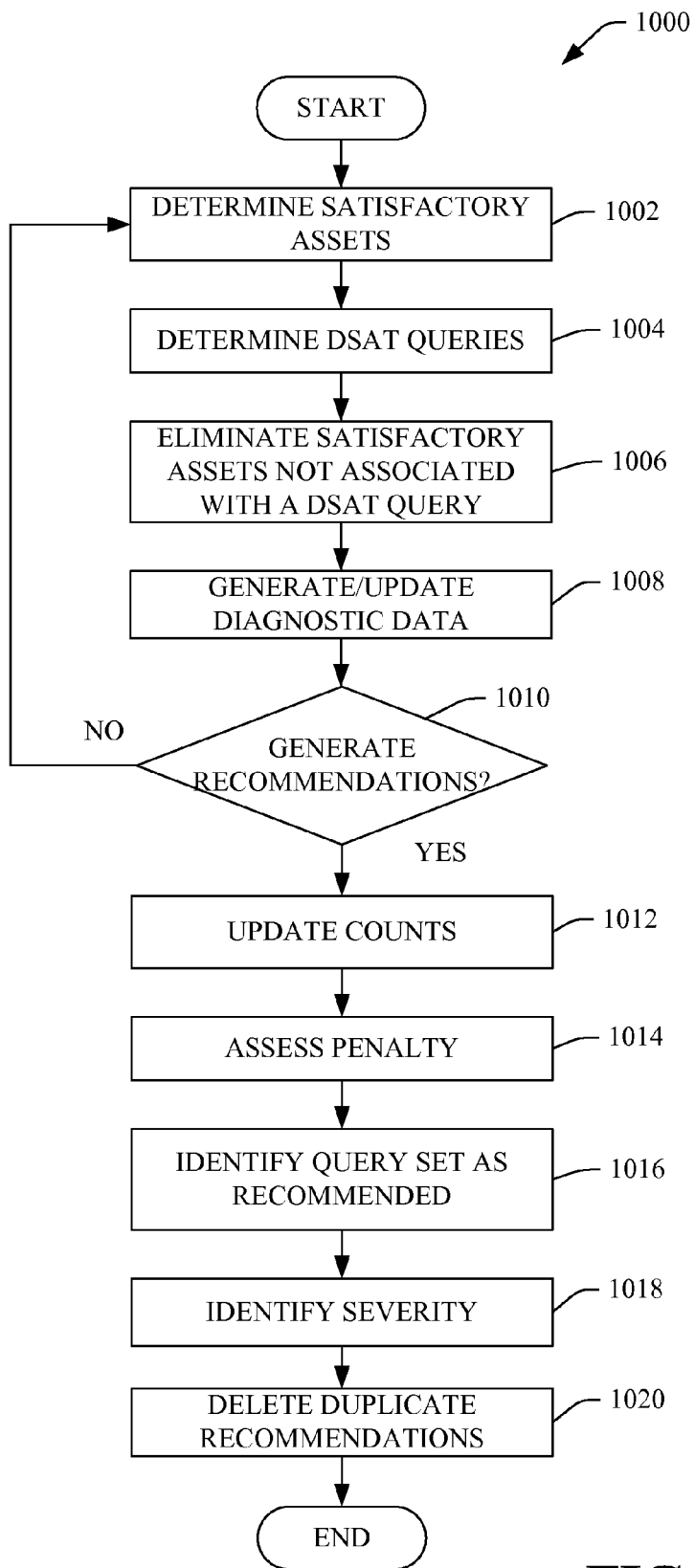
FIG. 10 illustrates another methodology for generating potential mapping recommendations in accordance with an aspect of the subject matter disclosed herein.

FIGS. 9 and 10 illustrate an exemplary database schema and a related exemplary methodology for generating query set-asset mapping recommendations. Exemplary schema 900 can maintain mapping recommendation information. Each asset contained in the data collection can have an associated mapping diagnostic node 902 that stores information regarding mappings for the particular asset. A mapping diagnostic component node 902 can include one or more mapping set nodes 904 that generally represent query sets.

A mapping set node 904 can be associated with one or more set user nodes 906 and set accept user nodes 908. Set user nodes 906 describe users whose sessions or queries support the recommendation of the query set for that asset. Users can be tracked to limit the amount of influence any one user or group of users can have on recommendations. This may reduce the probability that a user or small group of users will artificially influence the recommendations. Set accept user nodes 908 track the users that have already accepted an association or a mapping in the past. If a large number of users have already accepted a mapping, then the recommendation may be unnecessary.

A mapping diagnostic node 902 can also be associated with one or more accept comments nodes 910 related to a particular asset. An accept comment node 910 represents user feedback from users that have accepted the asset. Similarly, the mapping diagnostic node can be associated with one or more reject comment nodes 912 that represent user feedback from users that rejected the asset.

Turning now to FIG. 10, an exemplary methodology 1000 for determining mapping recommendations is illustrated. At 1002, satisfactory assets can be determined for a session. In particular, for each search, associated assets and feedback can be evaluated to determine whether an asset has been accepted by a user. A confidence score that reflects the probability that an asset was accepted can be compared to a configurable accept threshold to determine whether an asset is considered a satisfactory asset.

At 1004, for a session that has at least one satisfactory asset, all searches in the session that did not produce a satisfactory asset, referred to herein as DSAT queries, can be identified. In aspects, each query can have an associated dissatisfaction confidence based upon related feedback. The dissatisfaction confidence can be compared to a configurable dissatisfaction threshold to determine DSAT queries.

At 1006, any satisfactory assets identified in 1002 can be eliminated, if such assets are not associated with a query identified in at 1004. Diagnostic information can be generated and/or updated at 1008. In particular, records for the remaining satisfactory assets can be created or updated, and query sets can be added or updated. In addition, for each query set user information can be added, if the user does not already exist for that asset-query set-user combination. Any comments associated with an explicit acceptance of the asset can also be attached to the diagnostic record. Furthermore, a reject count that tracks number of rejections for a query set can be updated.

At 1010, a determination is made as to whether it is time to generate recommendations. Recommendations can be generated periodically (e.g., daily, weekly or quarterly), based upon content provider requests, or can be triggered by any indications that performance could be significantly enhanced using recommendations. If it is not time to generate recommendations, the process continues at 1002 for additional user sessions and queries.

If generation of recommendations is triggered, the process continues at 1012, where various counts are updated based upon information obtained since the previous generation of recommendations. The support and reject count for all query sets can be updated. In addition, a reject ratio associated with each query set can be updated. The reject ratio is equal to the ratio of rejections to support and can be computed as follows:

$$\text{reject count}/(\text{support}+\text{reject count})$$

The accept count for a query asset combination can also be updated based upon newly obtained data.

At 1014, penalties associated with recommendations can be applied. A penalty can be assessed if the number of assets associated with a query is greater than a configurable penalization threshold. The amount of the penalty can be a percentage of the support for each query set. Net support for a query set is equal to the support for a query set, less any penalties.

At 1016, query sets can be marked for recommendation. For example, a recommended flag associated with the query set can be set. Query sets can be that have a net support value greater than a minimum configurable threshold, that have a net support:reject count ratio that is less than the reject ratio described above, and an accept count that is less than or equal to the net support value.

An associated severity value can also be updated at 1018. The severity can be computed as follows:

$$\text{Severity}=(F/(F+A))*S$$

Here, F is equal to the number of failed user search supporting a recommendation; A is equal to the number of accepted user searches and S is equal to the sum of net support for all recommended query sets. The severity can be reset to zero if the number of recommended query sets exceeds a configurable threshold. Finally, at 1020, if there is already a recommendation active for the query set, the current recommendation can be deleted.

Figure 11:
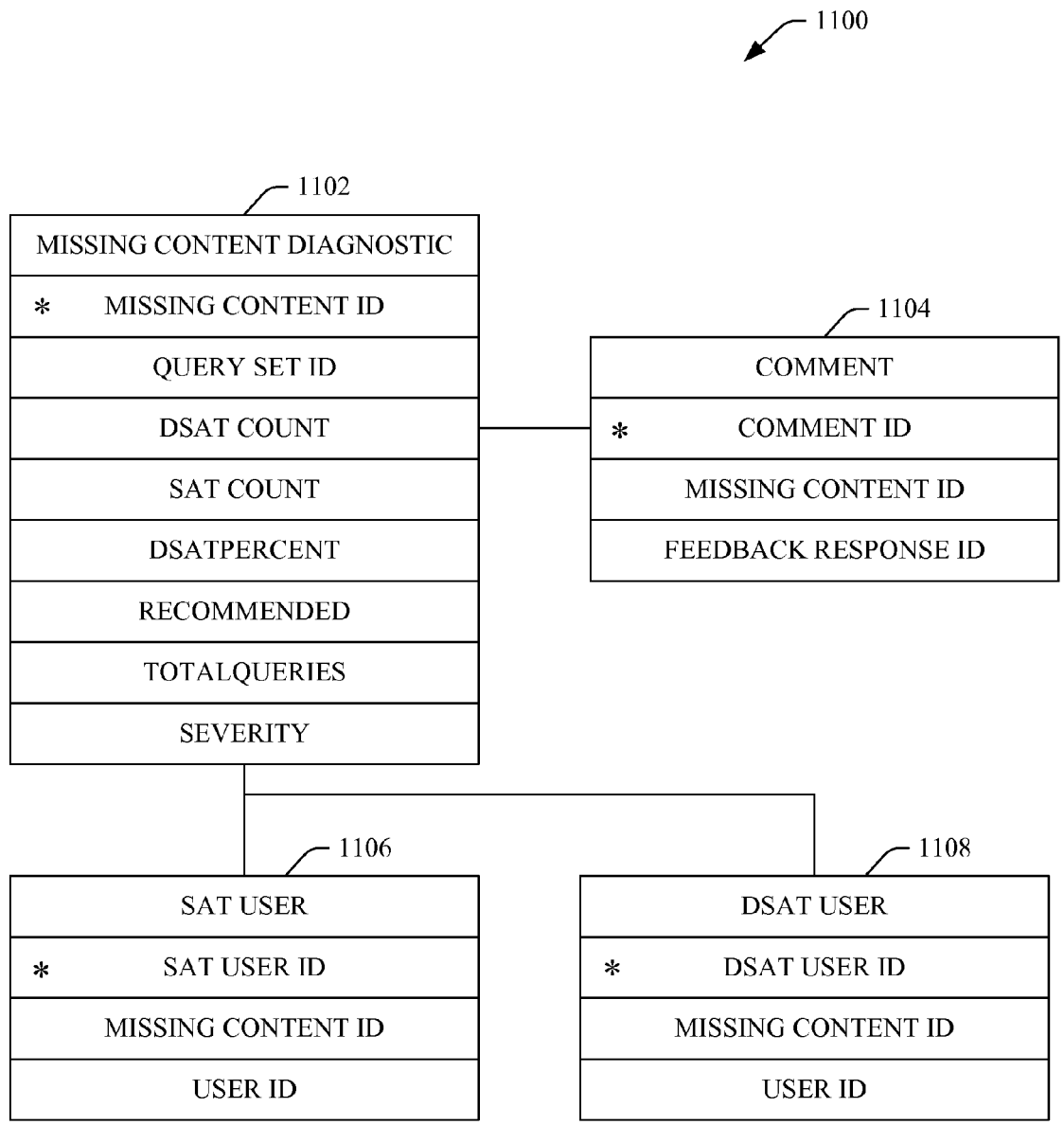
FIG. 11 illustrates an exemplary database schematic for missing content information in accordance with an aspect of the subject matter disclosed herein.
Figure 12:
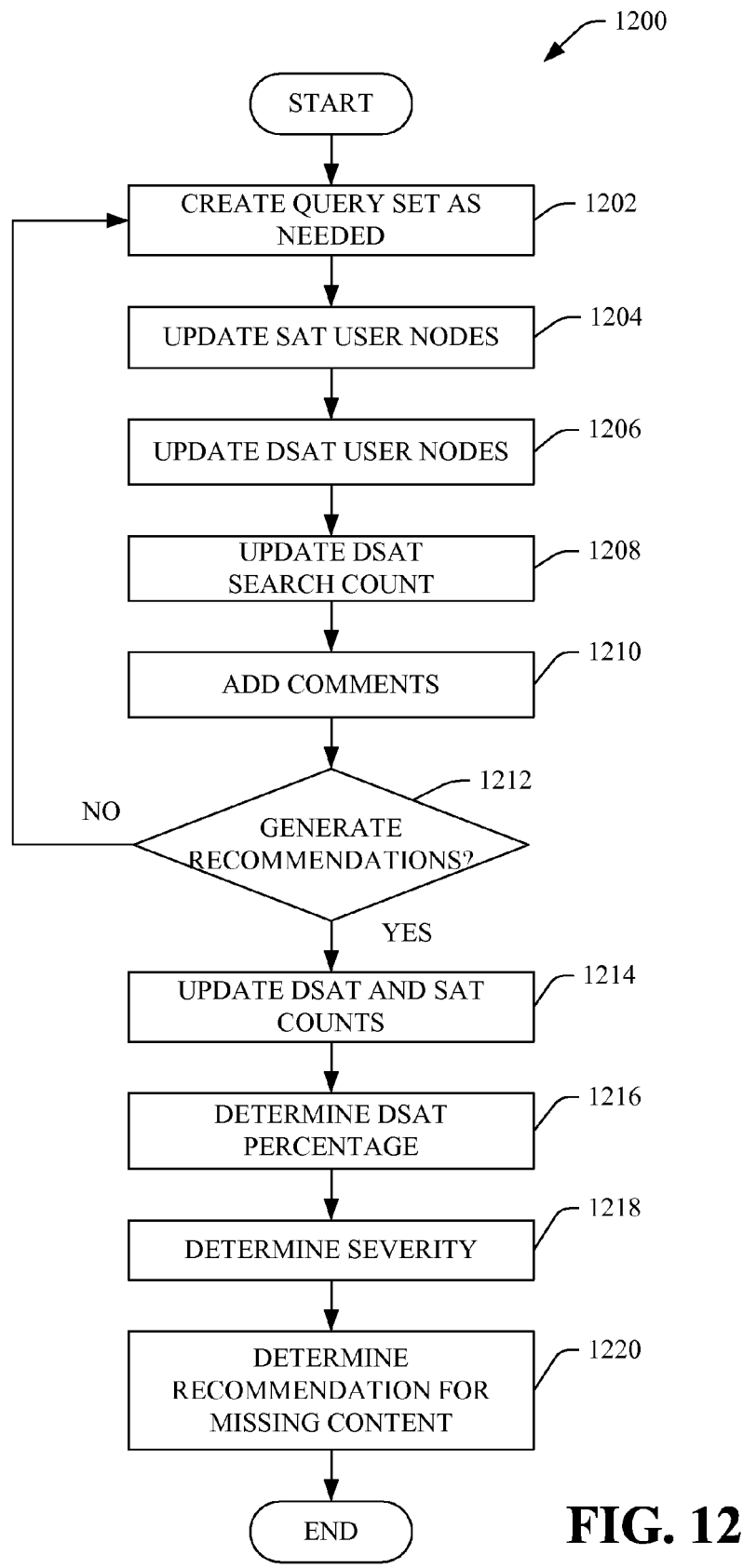
FIG. 12 illustrates an exemplary methodology for generating missing content recommendations in accordance with an aspect of the subject matter disclosed herein.

FIGS. 11 and 12 illustrate an exemplary database schema and a related exemplary methodology for generating missing content recommendations. Exemplary schema 1100 can maintain missing content information. Here, a missing content diagnostic node 1102 is associated with a query set. Any comments or user feedback can be included in a comment node 1104 associated with a missing content diagnostic node 1102.

A SAT user node 1106 and DSAT user node 1108 maintain data for users that issue a query within the query set represented by the missing content diagnostic node 1102. Users that are ultimately satisfied by an asset are included in the SAT user node 1106. Users that are not satisfied with obtained assets are included in the DSAT user node 1108. Counts of satisfied users and dissatisfied user can be maintained in the missing content diagnostic 11102.

Turning now to FIG. 12, a methodology 1200 for generating missing content recommendations is illustrated. At 1202, a missing content diagnostic record or node can be created for each new query set, if the query set does not already exist and if the query set is not already part of a mapping recommendation. At 1204, information regarding satisfied users can be associated with the query set. In particular, search confidence values can be compared to one or more thresholds to determine user satisfaction. For example, when search confidence levels exceed a Very Satisfied (VSAT) threshold or a Partially Satisfied (PSAT) threshold, the user can be considered a satisfied user, also referred to as a SAT user. If the user is already included in the record of satisfied users, the new record may be omitted to avoid giving an individual user excessive influence.

At 1206, information regarding dissatisfied users can be associated with a query set. In particular, if a user DSAT confidence value is above a configurable DSAT threshold, a DSAT user node can be associated with the query set, if the user is not already represented in DSAT user nodes or SAT user nodes. At 1208, the count of DSAT user searches can be updated. This count can be for distinct users. At 1210, any user comments associated with explicit rejections of assets can be recorded and associated with a missing content diagnostic.

At 1212, a determination is made as to whether it is time to generate recommendations. Recommendations can be generated periodically (e.g., daily, weekly or quarterly), based upon content provider requests, or can be triggered by any indications that performance could be significantly enhanced using recommendations. If it is not time to generate recommendations, the process continues at 1202 for additional user sessions and queries.

At 1214, the DSAT count and SAT count of the missing content diagnostic can be updated based upon recent information. At 1216, the DSAT percentage for each query set can be computed based upon the updated DSAT and SAT counts for the missing content diagnostic associated with the query set. The severity of the missing content diagnostic can be computed at 1218. In particular, severity can be equal to the DSAT percentage multiplied by the DSAT count.

At 1220, recommendations for missing content can be determined. In particular, a recommendation flag can be set for all missing content records where the DSAT percentage is greater than, or equal to, a configurable percentage threshold and the DSAT count is greater than, or equal to, a configurable count threshold. Content providers can add content to a web site or other data collection in response to missing content recommendations to enhance utility of the data collection.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 13:
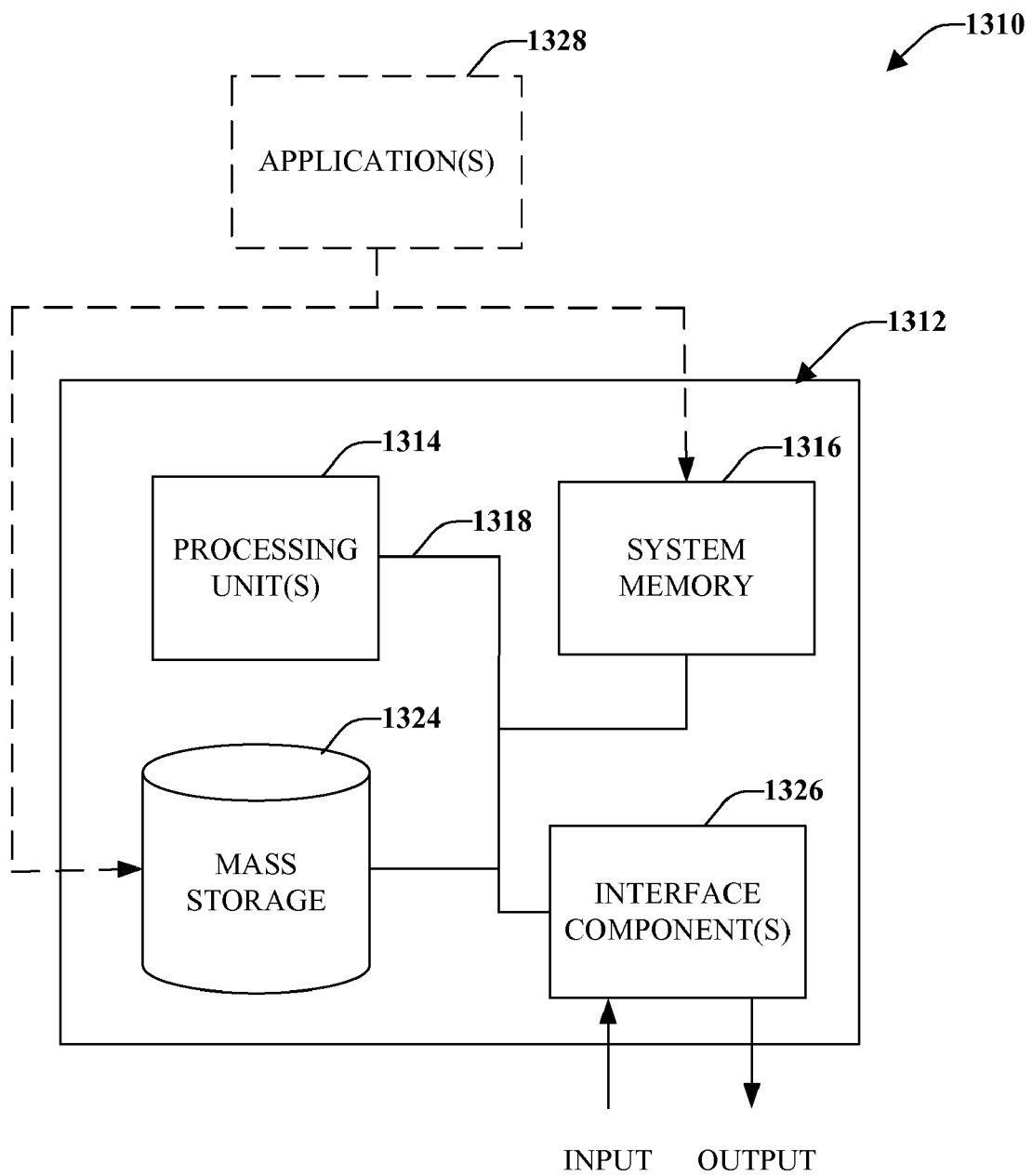
FIG. 13 is a schematic block diagram illustrating a suitable operating environment.
Figure 14:
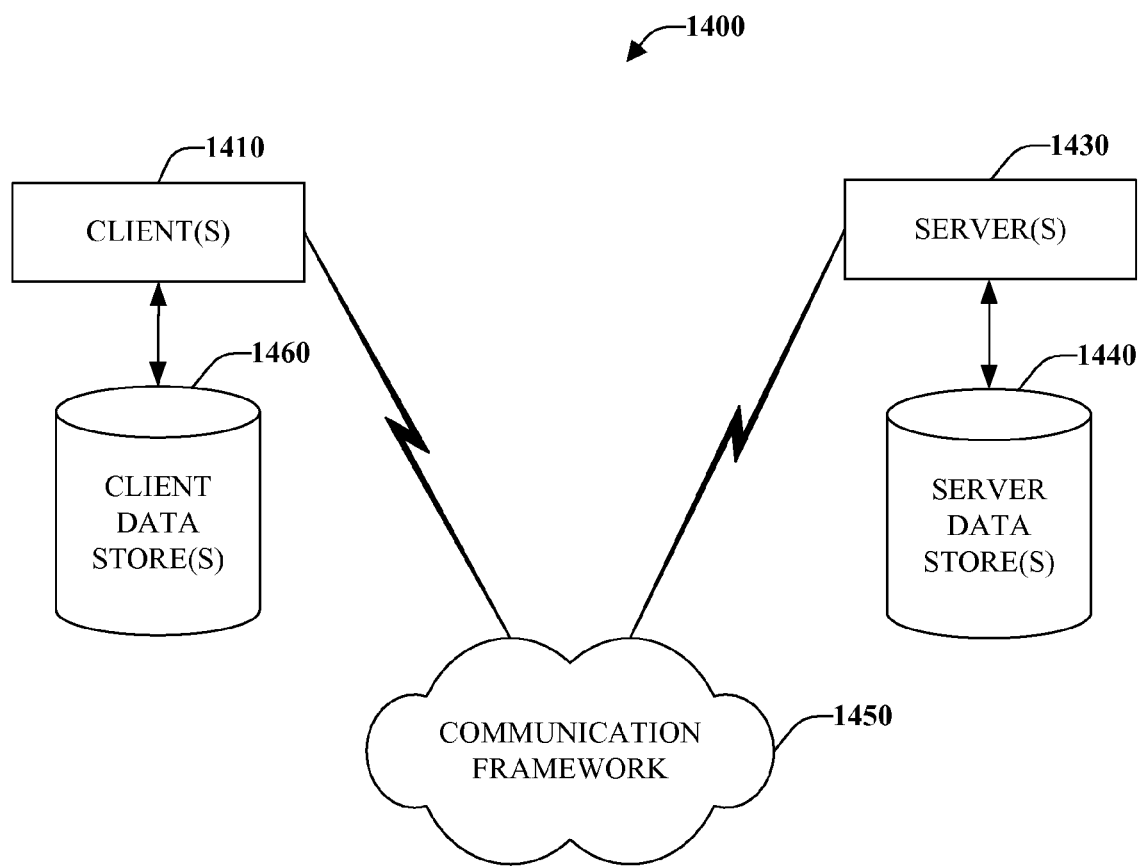
FIG. 14 is a schematic block diagram of a sample-computing environment

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. In particular, operating system can include diagnostic components capable of monitoring and averting failure of a hard disk drive. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430. Both the one or more client data store(s) 1460 and the one or more server data store(s) can utilize hard disk drives to maintain data. Both client(s) 1410 and server(s) 1430 can utilize a diagnostic component to prevent failure of data stores and mitigate loss of data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A diagnostic system that facilitates evaluation of performance of a search system, comprising:
   a memory for storing a plurality of components comprising executable program code; and
   a processor functionally coupled to the memory, the processor being responsive to computer-executable instructions contained in the program code and operative:
      to identify a set of substantially similar search queries issued by a plurality of search system users, wherein the set of substantially similar search queries are grouped for analysis, the grouped set of search queries being issued by disparate search system users;
      to identify a mapping recommendation that relates the grouped set of search queries issued by the disparate search system users to an accepted asset within a data collection when at least one query in the set of search queries appears in a session that leads to the accepted asset, wherein the at least one query is within a session comprising a plurality of queries, the at least one query comprising at least one previous query made prior to a subsequent query, the subsequent query resulting in the retrieval of an accepted asset in the session, wherein the at least one previous query does nor result in the retrieval of the accepted asset, wherein the mapping indicates a relationship between the grouped set of search queries and the accepted asset where the grouped set of search queries would not otherwise be associated with the accepted asset;
      to evaluate search system performance as a function of the set of search queries; and
      to generate a confidence value based upon the amount of support for the mapping within the search data that reflects probable user satisfaction associated with the mapping recommendation, wherein the mapping recommendation is categorized based upon the confidence value, wherein the mapping recommendation is implemented automatically by the search system when the mapping recommendation has a high confidence value, wherein the mapping recommendation is included in recommendations to content providers by the search system when the mapping recommendation has a mid-range confidence value and wherein the mapping recommendation is identified for further evaluation by the search system when the mapping recommendation has a relatively low confidence value.

2. The system of claim 1, wherein the processor is further operative to obtain search data that includes search history for the search system and the set of search queries is identified from the search data.

3. The system of claim 1, wherein the processor is further operative to adjust the confidence value as a function of at least one of number of assets to which the set of queries is mapped, number of query sets to which the asset is mapped, or a combination thereof.

4. The system of claim 1, wherein the processor is further operative to adjust the confidence value as a function of combinations of the set of queries and the asset within the search data.

5. The system of claim 1, further comprising a user interface that alerts a user to the mapping recommendation.

6. The system of claim 1, wherein the processor is further operative to analyze at least one of implicit user feedback, explicit user feedback, or a combination thereof to determine user satisfaction with the asset, wherein the mapping recommendation is based at least in part upon user satisfaction with the asset.

7. The system of claim 1, wherein the processor is further operative to identify potential content related to the set of queries for addition to a data collection associated with the search system.

8. The system of claim 7, wherein the processor is further operative to determine if there is a mapping recommendation that relates the set of search queries to an asset within the data collection prior to recommending addition of the potential content to the data collection.

9. A methodology that facilitates evaluation of search performance, comprising:
   obtaining a search history associated with a search system that searches a data set;
   analyzing at least one group of similar queries within the search history, the at least one group of similar queries being issued by disparate search system users;
   identifying a mapping recommendation that relates the at least one group of similar queries issued by the disparate search system users to an accepted asset within a data collection when at least one query in the set of search queries appears in a session that leads to the accepted asset, wherein the at least one query is within a session comprising a plurality of queries, the at least one query comprising at least one previous query made prior to a subsequent query, the subsequent query resulting in the retrieval of an accepted asset in the session, wherein the at least one previous query does nor result in the retrieval of the accepted asset, wherein the mapping indicates a relationship between the at least one group of similar queries and the accepted asset where the at least one group of similar queries would not otherwise be associated with the accepted asset;
   determining a potential modification designed to enhance user satisfaction with the search system as a function of the analysis of the group of similar queries; and
   generating a confidence value based upon the amount of support for the mapping within the search data that reflects probable user satisfaction associated with the mapping recommendation, wherein the mapping recommendation is categorized based upon the confidence value, wherein the mapping recommendation is implemented automatically by the search system when the mapping recommendation has a high confidence value, wherein the mapping recommendation is included in recommendations to content providers by the search system when the mapping recommendation has a mid-range confidence value and wherein the mapping recommendation is identified for further evaluation by the search system when the mapping recommendation has a relatively low confidence value.

10. The methodology of claim 9, further comprising:

selecting a candidate query from the search history;

identifying a group from the at least one group of queries, wherein the candidate query is a member of the identified group; and determining a score that reflects the utility of a mapping of the candidate query to an asset within the data set, wherein the score is based at least in part upon support related to the identified group of queries.

11. The methodology of claim 10, further comprising applying a penalty to the score as a function of at least one of broad nature of the asset, broad nature of the candidate query, or a combination thereof.

12. The methodology of claim 9, further comprising generating a recommendation to add content to the data set, wherein the recommendation is a function of the analysis of the at least one group of similar queries.

13. The methodology of claim 12, further comprising:

selecting a group from the at least one group of similar queries; and determining a percentage of unsuccessful queries within the selected group, wherein the recommendation is based at least in part upon comparison of the percentage to a configurable threshold.

14. The methodology of claim 13, further comprising determining whether a mapping recommendation exists for the selected group of queries, wherein the recommendation is based at least in part upon the determination.

15. The methodology of claim 9, wherein queries within the at least one group of queries are identified as similar based upon a search term contained within the queries.

16. The methodology of claim 15, wherein syntactic variations among search terms are ignored during identification of the similar queries.

17. A diagnostic apparatus that facilitates evaluation of performance of a search system, comprising:

a memory means for storing a plurality of components comprising executable program code; and a processing means functionally coupled to the memory means, the processor being responsive to computer-executable instructions contained in the program code and operative:

to identify a set of substantially similar search queries issued by a plurality of search system users, wherein the set of substantially similar search queries are grouped for analysis, the grouped set of search queries being issued by disparate search system users;

to identify a mapping recommendation that relates the grouped set of search queries issued by the disparate search system users to an accepted asset within a data collection when at least one query in the set of search queries appears in a session that leads to the accepted asset, wherein the at least one query is within a session comprising a plurality of queries, the at least one query comprising at least one previous query made prior to a subsequent query, the subsequent query resulting in the retrieval of an accepted asset in the session, wherein the at least one previous query does nor result in the retrieval of the accepted asset, wherein the mapping indicates a relationship between the grouped set of search queries and the accepted asset where the grouped set of search queries would not otherwise be associated with the accepted asset;

to evaluate search system performance as a function of the set of search queries; and to generate a confidence value based upon the amount of support for the mapping within the search data that reflects probable user satisfaction associated with the mapping recommendation, wherein the mapping recommendation is categorized based upon the confidence value, wherein the mapping recommendation is implemented automatically by the search system when the mapping recommendation has a high confidence value, wherein the mapping recommendation is included in recommendations to content providers by the search system when the mapping recommendation has a mid-range confidence value and wherein the mapping recommendation is identified for further evaluation by the search system when the mapping recommendation has a relatively low confidence value.

* * * * *